United States Patent
Tourniaire et al.

(10) Patent No.: US 11,067,163 B2
(45) Date of Patent: Jul. 20, 2021

(54) EPICYCIC GEARTRAIN, A GEARBOX, AND AIRCRAFT, AND A METHOD

(71) Applicant: AIRBUS HELICOPTERS, Marignane (FR)

(72) Inventors: Jean-Claude Tourniaire, Les Milles (FR); Jeremy Martinez, Salon de Provence (FR); Romain Tailler, Ventabren (FR)

(73) Assignee: AIRBUS HELICOPTERS, Marignane (FR)

(*) Notice: Subject to any disclaimer, the term of this patent is extended or adjusted under 35 U.S.C. 154(b) by 0 days.

(21) Appl. No.: 16/815,086

(22) Filed: Mar. 11, 2020

(65) Prior Publication Data
US 2020/0292059 A1    Sep. 17, 2020

(30) Foreign Application Priority Data
Mar. 11, 2019 (FR) ...................................... 1902446

(51) Int. Cl.
*F16H 57/08* (2006.01)
*F16H 1/28* (2006.01)
*F16H 57/04* (2010.01)

(52) U.S. Cl.
CPC ............. *F16H 57/082* (2013.01); *F16H 1/28* (2013.01); *F16H 57/043* (2013.01); *F16H 57/0479* (2013.01); *F16H 57/0486* (2013.01); *F16H 2057/085* (2013.01)

(58) Field of Classification Search
None
See application file for complete search history.

(56) References Cited

U.S. PATENT DOCUMENTS

| 3,303,713 A | 2/1967 | Hicks |
| 3,635,103 A | 1/1972 | Monti |
| 6,106,429 A | 8/2000 | Mortensen |

(Continued)

FOREIGN PATENT DOCUMENTS

| EP | 0003894 A1 | 9/1979 |
| FR | 1423589 A | 1/1966 |

(Continued)

OTHER PUBLICATIONS

EPO search report for related EP application EP20160352, dated Jul. 3, 2020.*

(Continued)

*Primary Examiner* — Colby M Hansen
(74) *Attorney, Agent, or Firm* — Brooks Kushman P.C.

(57) ABSTRACT

An epicyclic gear train including a plurality of planet gears that are carried by a common planet carrier, the planet carrier comprising a support and a plurality of pins carried by the support, each pin having a fastening segment extending in a direction away from the support to a distal end, each planet gear being arranged around a respective one of the fastening segments and presenting a degree of freedom to move in rotation about an extension axis along which the fastening segment extends. A retaining link is carried by the pins and connects the pins together, each planet gear being arranged in a zone lying between the support and the retaining link, each pin presenting a restricted degree of freedom to move relative to the retaining link.

13 Claims, 3 Drawing Sheets

(56) References Cited

U.S. PATENT DOCUMENTS

| | | | | |
|---|---|---|---|---|
| 8,480,527 B2 * | 7/2013 | Snyder | ............... | F02C 7/36 |
| | | | | 475/162 |
| 2010/0056321 A1 * | 3/2010 | Snyder | ............... | F02C 7/36 |
| | | | | 475/331 |
| 2011/0009233 A1 * | 1/2011 | Mizuno | ............ | F16H 57/082 |
| | | | | 475/331 |

FOREIGN PATENT DOCUMENTS

| | | | |
|---|---|---|---|
| FR | 3036763 | A1 | 12/2016 |
| JP | 2000240735 | A | 9/2000 |

OTHER PUBLICATIONS

French Search Report for French Application No. FR 1902446, Completed by the French Patent Office, dated Nov. 26, 2019, 9 pages.

\* cited by examiner

EPICYCIC GEARTRAIN, A GEARBOX, AND AIRCRAFT, AND A METHOD

CROSS-REFERENCE TO RELATED APPLICATIONS

This application claims priority to French patent application No. FR 1902446 filed on Mar. 11, 2019, the disclosure of which is incorporated in its entirety by reference herein.

BACKGROUND OF THE INVENTION

(1) Field of the Invention

The present invention relates to an epicyclic geartrain, to a gearbox having such an epicyclic geartrain, to an aircraft provided with such an epicyclic geartrain, and to a method.

(2) Description of Related Art

The invention thus lies in the field of gearing, and in particular main gearboxes for rotorcraft.

An epicyclic geartrain conventionally comprises a sun gear and an outer annulus gear. Furthermore, an epicyclic geartrain includes a plurality of gears forming planet gears that are carried by a planet carrier. The teeth of the planet gears mesh with the sun gear and with the outer annulus gear. Depending on the variant, it is the sun gear, the planet carrier, or the annulus gear that is secured to the inlet shaft or to the outlet shaft. For example, the annulus gear may be stationary, with the sun gear being secured to the inlet shaft, and the planet carrier being secured to the outlet shaft.

In this context, the planet carrier comprises a support carrying pins. The pins are rigidly fastened to the support.

Under such circumstances, each planet gear has a rim. The rim extends radially from an inner face to an outer race carrying teeth. The rim is arranged around a pin. For example, a roller bearing may be interposed between the inner face of the rim and the pin. The inner face of the rim may represent an outer race of the roller bearing, with the pin representing an inner race of the roller bearing.

While in operation, an epicyclic geartrain may deteriorate. Thus, a crack may appear within the rim of a planet gear. The crack may cause the rim to open, leading to malfunction of the epicyclic geartrain.

Two types of epicyclic geartrain are known.

A first type of epicyclic geartrain is referred to as being "open", for convenience. Specifically, such an open epicyclic geartrain has pins cantilevered out from the support, i.e. pins extending axially from the support to distal ends that are left free.

A second type of epicyclic geartrain is referred to as being "closed", for convenience. Specifically, such a closed epicyclic geartrain has pins with distal ends secured to a ring, the ends of the pins being prevented from moving relative to one another.

Document FR 1 423 589 describes a flexible planet carrier provided with pins for compensating machining inaccuracies. A sleeve can then be arranged between the rim of each planet gear and the corresponding pin. The sleeve is fastened rigidly to the corresponding pin.

Documents US 2011/009233, US 2010/056321, FR 3 036 763, U.S. Pat. Nos. 6,106,429, 3,635,103, EP 0 003 894, and JP 2000/240735 are also known.

BRIEF SUMMARY OF THE INVENTION

An object of the present invention is thus to propose an innovative epicyclic geartrain tending to tolerate degradations and to propose an additional safety barrier against failures of a planet gear.

According to the invention, an epicyclic geartrain comprises a sun gear and an outer annulus gear, the epicyclic geartrain being provided with a plurality of planet gears that are carried by a common planet carrier. In normal operation, teeth of the planet gears mesh with the sun gear and with the outer annulus gear. The planet carrier comprises a support and a plurality of pins carried by said support, each pin having a fastening segment extending in a direction away from said support to a distal end, each planet gear being arranged around a respective one of said fastening elements and presenting a degree of freedom to move in rotation about an extension axis along which said fastening element extends.

The epicyclic geartrain includes a retaining link that is carried by said pins and that connects the pins together, each planet gear being arranged in a zone lying between the support and the retaining link, each pin presenting a restricted degree of freedom to move relative to the retaining link.

For example, the pins are arranged in such a manner that their respective distal ends, when stationary, are inscribed on a geometrical circle. The term "geometrical circle" does not designate a physical ring but rather a geometrical shape circumferentially connecting together the distal ends of the pins, each distal end lying circumferentially between two adjacent distal ends. The distal ends may be uniformly distributed circumferentially, with the same circular arc lying between any two adjacent distal ends.

The term "each pin presenting a restricted degree of freedom to move relative to the retaining link" means that each pin is free to move relative to the retaining link by an amount greater than mere assembly clearance, but that its movement is nevertheless restricted to an amount that is predetermined. In particular, a pin is free to move relative to the retaining link when at rest, e.g. on being pushed by a human, and also when in use, i.e. while the planet carrier is rotating about its axis of rotation. At rest, the retaining link need not exert any force on the pins, in particular radially, and/or ignoring any axial force due to gravity, i.e. the retaining link exerts substantially no force or strictly no force. Likewise, under normal conditions of operation in which all of the pins are moving in uniform manner, the retaining link need not exert any force on the pins, i.e. the retaining link exerts substantially no force or strictly no force. In contrast, if deformation of the planet carrier in use gives rise to the pins moving in opposing directions, the retaining link exerts a force on the pins to counter this effect. For example, each pin may have at least two degrees of freedom, and in particular two degrees of freedom to move in translation in a plane orthogonal to the pin, these degrees of freedom nevertheless being restricted to predetermined movement ranges.

Such an epicyclic geartrain of the invention may tend to have an improved lifetime.

The applicant has identified a particular mode in which an epicyclic geartrain can malfunction. In operation, the pins tend to tilt in the presence of torque, with each pin presenting an angle relative to the central axis of rotation of the planet carrier. This angle is small, but it is not zero. The pins nevertheless remain perpendicular to the support, which means that the support deforms when the pins tilt.

In normal operation, the angles of all of the pins are substantially equivalent, which tends to keep the distance between the two distal ends of two adjacent pins substantially constant. There is then no risk of interference between two planet gears arranged on two adjacent pins.

In contrast, when the rim of a planet gear breaks as a result of wear, of spalling, or of fatigue failure, for example, that planet gear is subjected to reduced mechanical stress. The pin carrying the damaged planet gear tilts differently from the others, thereby leading to erratic deformation of the planet carrier in the vicinity of that pin.

A split planet gear may possibly damage the adjacent planet gear and give rise to malfunction of the epicyclic geartrain.

Also, any opening of the damaged planet gear can prevent a tooth of that planet gear taking up a position between two teeth of the sun gear. This opening can prevent proper meshing between the planet gear and the annular gear, and/or between the planet gear and the sun gear, or it can lead to interference between said planet gear and the adjacent planet gears. This tooth of the planet gear thus runs the risk of pressing against the top land of a tooth of the sun gear, thereby tending to move the damaged planet gear radially towards the annulus gear. The damaged planet gear then exerts a considerable radial force against the annulus gear, which might damage the annulus gear.

The holder system of the invention then tends to solve this problem in innovative manner by means of an epicyclic geartrain that is neither "open" nor "closed", but somewhere in between.

On a conventional open epicyclic geartrain, the pins present considerable tangential flexibility, which means they cannot limit movement of an open planet gear.

A conventional closed epicyclic geartrain includes a rigid part holding the ends of the pins strictly in place, even in the absence of defects. A closed epicyclic geartrain implies a greater dispersion in the distribution of forces on the pins. During operation, a closed epicyclic geartrain is then subjected to fatigue forces that are greater and it can thus have a lifetime that is shortened.

The retaining link of the invention makes it possible for the distance between two adjacent pins to be kept not strictly constant, but rather variable within a predefined range, e.g. about one tenth of a millimeter. Unlike a closed epicyclic geartrain, the distal ends of the pins do have some degree of freedom to move relative to the retaining link, but unlike an open epicyclic geartrain, this degree of freedom to move is restricted. In particular, radial clearance between each pin and the retaining link allows the retaining link to have no impact on the behavior of the planet carrier under normal conditions of use, i.e. when there is no broken planet gear. The retaining link is then passive because of its intrinsic relative flexibility and because of the presence of clearance between the pins and the retaining link, and it is not subjected to large forces. Said clearance between the pins and the retaining link is different from manufacturing tolerances and may potentially be greater. In contrast, if a planet gear opens or breaks accidentally, the retaining link tends to keep the pin in position and thus to keep the defective planet gear in position.

The epicyclic geartrain may also have one or more of the following characteristics.

Thus, the retaining link may comprise a plate, e.g. at least between two attachment points to two adjacent pins. A plate of the retaining link may be substantially plane in shape.

Such a retaining link may be sufficiently light and flexible to avoid disturbing the operation of the planet carrier under normal conditions. It is possible to envisage other means that present great stiffness during a variation of distance, such as a connecting rod or a cable.

In one aspect, the retaining link may be annular in shape, in particular locally and/or in the presence of a plate connecting two attachment points together.

In one aspect, the retaining link may include a respective centering stud for each pin, each pin and an associated said centering stud being engaged at least in part axially one in the other along the extension axis of said pin, said centering stud penetrating into a cavity in the associated pin or said pin penetrating into a cavity in said associated centering stud, a pin and the associated centering stud being spaced apart at rest by radial clearance perpendicular to said extension axis of the pin.

Such an extension axis may be an axis of symmetry of the pin. At rest, the extension axis may coincide with an axis of symmetry of the associated centering stud.

The centering pegs represent attachment points. Each centering stud is connected to at least one adjacent centering stud by a rigid member of the retaining link, e.g. such as a plate or connecting rods.

This mutual engagement of a pin and a centering stud allows the pin to move relative to the retaining link because of the radial clearance, which may be about one tenth of a millimeter, for example. In nominal mode, i.e. when the system is moving and none of the planet gears has failed, the plate is not stressed. Furthermore, such engagement can improve the transmission of forces between the pin and the retaining link by friction and by normal thrust, there being no need for these forces necessarily to pass via fastener members.

Optionally, relative to the associated centering stud, each pin has at least two degrees of freedom to move in translation in a plane orthogonal to the extension axis of the pin.

In one aspect, each centering stud may include a connection wall, each pin including a web, and each connection wall being screwed to a web by a threaded member.

The terms "connection wall" and "web" are used for convenience to distinguish two walls and/or sheets belonging respectively to the retaining link and to a pin, and they are to be considered relative to a direction going from the retaining link to the pin.

Because of the above-mentioned mutual engagement, forces do not necessarily pass via the threaded member. Such a threaded member may be in the form of a screw, a peg . . . .

Using a nut-and-bolt system for connecting the retaining link to the pin makes it possible for the retaining link to be removable in order to access the planet gears, should that be necessary.

At rest, i.e. when the epicyclic geartrain is not moving, said connection wall nay bear against said web along said extension axis.

In one possibility, said threaded member and said web are spaced apart radially by first clearance perpendicular to said extension axis of the pin to the threaded member, said threaded member and said connection wall being spaced apart radially by second clearance perpendicular to said extension axis of the pin and/or to the threaded member, at least one of the first clearance and the second clearance possibly being greater than the radial clearance.

The radial clearance is then less than the first clearance and/or the second clearance so as to guarantee that forces are transmitted directly between the centering stud and the associated pin. This characteristic makes it possible to obtain a threaded member of small diameter.

For example, at least one of the first clearance and the second clearance is greater than or equal to twice the radial clearance.

Consequently, the first clearance is greater than or equal to twice the radial clearance and/or the second clearance is greater than or equal to twice the radial clearance.

By way of example, the radial clearance may be defined by testing, by calculation, or by simulation, in order for it to be large enough to ensure that the assembly is statically determinate, unlike a closed epicyclic geartrain, and small enough to ensure that forces are taken up directly between the pin and the retaining link when a planet gear fails.

The radial clearance may lie between a lower bound and an upper bound. The lower bound may be greater than the manufacturing tolerance that can be achieved and it may be determined so as to accommodate deformation. The upper bound of the radial clearance may be determined as a function of a maximum opening that is allowable, where such maximum opening avoids any interference between adjacent planet gears and makes it possible to remain within a non-divergent mode of meshing.

In one aspect, each pin may present an internal space that is in hydraulic communication with an outside medium, said pin presenting a lubrication orifice in fluid flow communication with a planet gear carried by the pin, said web presenting a first channel facing a second channel of the connection wall, said second channel opening out to said outside medium.

In operation, the inside space may be fed with lubricating liquid by a conventional lubrication system. The lubricating liquid enters the inside space and lubricates the associated bearing members via each lubrication orifice. At rest, the lubricating liquid may be discharged by gravity successively via the first and second channels.

In another aspect, said retaining link may include a stop system for stopping rotation of an inner race of a bearing member of each pin, said stop system projecting from said retaining link towards said zone in order to prevent said inner race of a bearing member from rotating relative to the pin, said bearing member being interposed between a pin and a planet gear. For example, the system for stopping rotation may comprise a rotation-blocking stud.

In one aspect, between two centering studs, the retaining link may present thickness that is smaller than the thickness of the support.

For example, between two centering studs, the retaining link may present thickness that is appropriate for its function, i.e. presenting stiffness that is low in bending and high in traction, low stiffness naturally being smaller than high stiffness. By way of example, the thickness of the retaining link between two pins is at least five times smaller than the thickness of the support of the planet carrier.

Such thickness allows the retaining link to avoid impeding the operation of the planet carrier under normal conditions and/or to avoid any interference and/or to remain in a non-divergent mode of meshing.

Thickness is the smallest dimension of the body in question. By way of example, for the retaining link, such thickness should be considered between an inner face of the retaining link facing the planet gears and an outer face of the retaining link opposite from its inner face.

The invention also provides a gearbox for an aircraft, the gearbox including an epicyclic geartrain of the invention.

Likewise, the invention provides an aircraft including an epicyclic geartrain of the invention, possibly within a gearbox.

The invention also provides a method of optimizing an epicyclic geartrain comprising a sun gear and an outer annulus gear, in order to make it tolerate degradation and provide an additional safety barrier against a failure of a planet gear, said epicyclic geartrain being provided with a. plurality of planet gears that are carried by a common planet carrier, the planet carrier comprising a support and a plurality of pins carried by said support, each pin having a fastening segment extending in a direction away from said support to a distal end, each planet gear being arranged around a respective one of said fastening segments and presenting a degree of freedom to move in rotation about said fastening segment extends.

Each distal end is spaced apart from another distal end adjacent thereto by a distance, and said method includes a step of connecting the pins together with a retaining link, each pin having a restricted degree of freedom to move relative to the retaining link. The retaining link exerts no force on the pins under normal conditions, and it keeps said distance within a predefined range in the presence of a crack in a planet gear. The term "the retaining link exerts no force on the pins under normal conditions" means that the retaining link exerts substantially no force on the pins under normal conditions, i.e. at rest or indeed so long as the pins tilt in uniform manner, and thus means:

either that the retaining link exerts strictly no force on the pins under normal conditions;

or else that the retaining link exerts negligible force on the pins under normal conditions, i.e. it exerts a force that does not tend to move the pins and in particular a force that is less than a force exerted on at least one pin in the presence of a crack in a planet gear in order to keep said distance in a predefined range.

Said retaining link may include a respective centering stud for each pin, each pin and an associated said centering stud being engaged at least in part axially one in the other along the extension axis of said pin, said centering stud penetrating into a cavity in the associated pin or said pin penetrating into a cavity in said associated centering stud, a pin and the associated centering stud being spaced apart at rest by radial clearance perpendicular to said extension axis of the pin.

In one aspect, and by way of example, each pin has a restricted degree of freedom to move relative to the retaining link in a direction that is tangential, i.e. substantially around an axis of rotation of the planet carrier.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
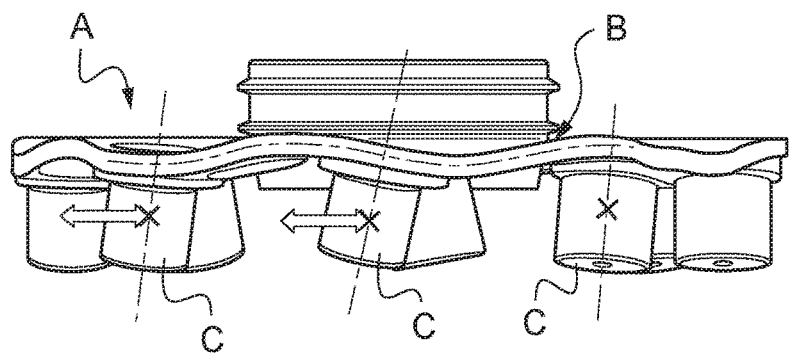
FIG. 1 is a diagram showing a prior art planet carrier in use and in the absence of a defect.
Figure 2:
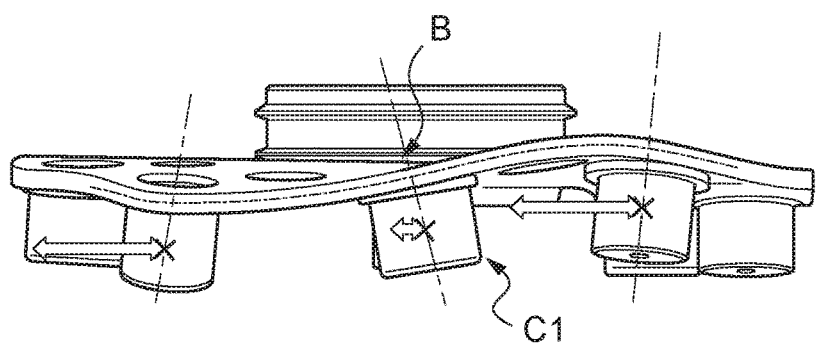
FIG. 2 is a diagram showing the deformation of the prior art planet carrier in use and in the presence of a defective planet gear.

FIGS. 1 and 2 show the problem.

In FIG. 1, an epicyclic geartrain presents a planet carrier A of the prior art. The planet carrier A is provided with a support B carrying pins C, the pins C carrying planet gears that are not shown.

Under the forces to which they are subjected while the epicyclic geartrain is moving, all of the pins C can become tilted in substantially identical manner, thereby tending to deform the support B. The support B deforms and takes up a "wavy" appearance.

With reference to FIG. 2, if a planet gear opens, then the pin C1 carrying the damaged planet gear is subjected to less stress. This pin C1 then tilts in a manner that is different from the other pins. The behavior of the entire epicyclic geartrain is disturbed thereby.

Figure 3:
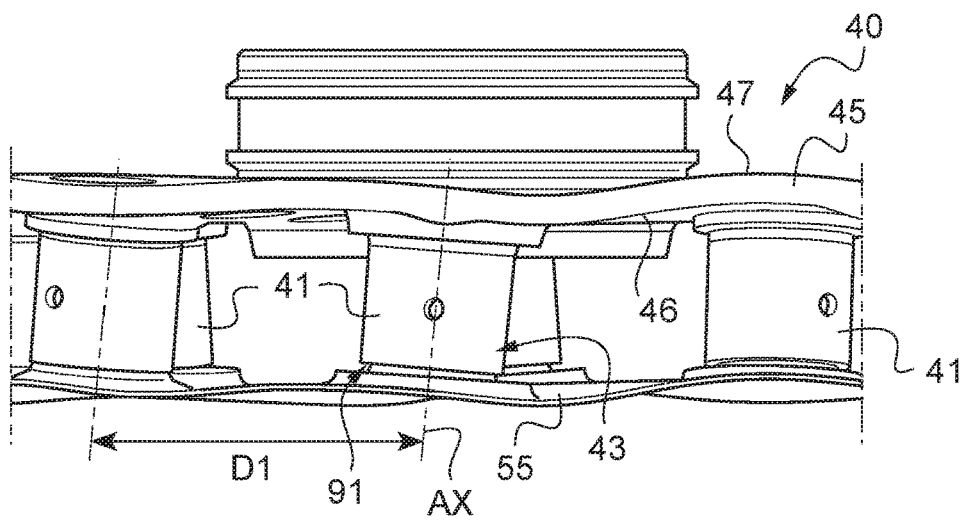
FIG. 3 is a diagram showing a planet carrier of the invention in use and in the absence of a defect.

With reference to FIG. 3 and in accordance with the invention, an epicyclic geartrain presents a planet carrier 40. This planet carrier 43 has a support 45. The support 45 carries pins 41, each pin 41 extending from the support 45 to a distal end 43. The pins may all extend from one side only of the support.

The epicyclic geartrain includes a retaining link 55 connecting together the distal ends 43 of the pins 41, and radial clearance 91 is left at rest between each pin 41 and the retaining link 55 in a direction that is orthogonal to an extension axis AX along which the pin extends.

Under normal conditions, the radial clearance 91 serves to make the retaining link 55 substantially transparent for the planet carrier 40.

Figure 4:
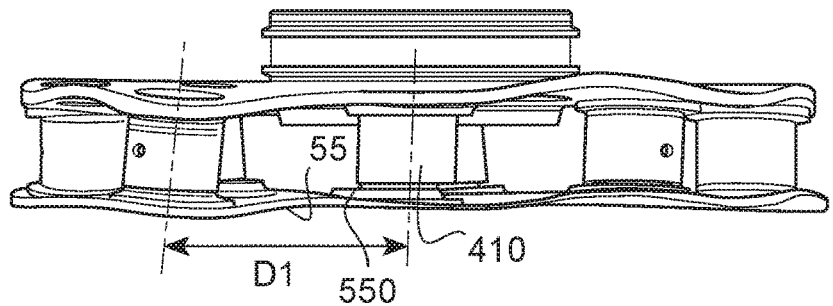
FIG. 4 is a diagram showing a planet carrier of the invention in use and in the presence of a defective planet gear.

In contrast, and with reference to FIG. 4, if a planet gear opens, then the pin 410 carrying it tends to tilt in a manner that is different from the other pins. The retaining link 55 limits this tilting by shapes interfering, thereby avoiding the phenomenon shown in FIG. 2. Specifically, the pin 410 comes into abutment against a wall 550 of the retaining link 55, thereby limiting its movement. The retaining link 55 thus serves to keep the distance D1 between two pins substantially constant (ignoring clearance).

Figure 5:
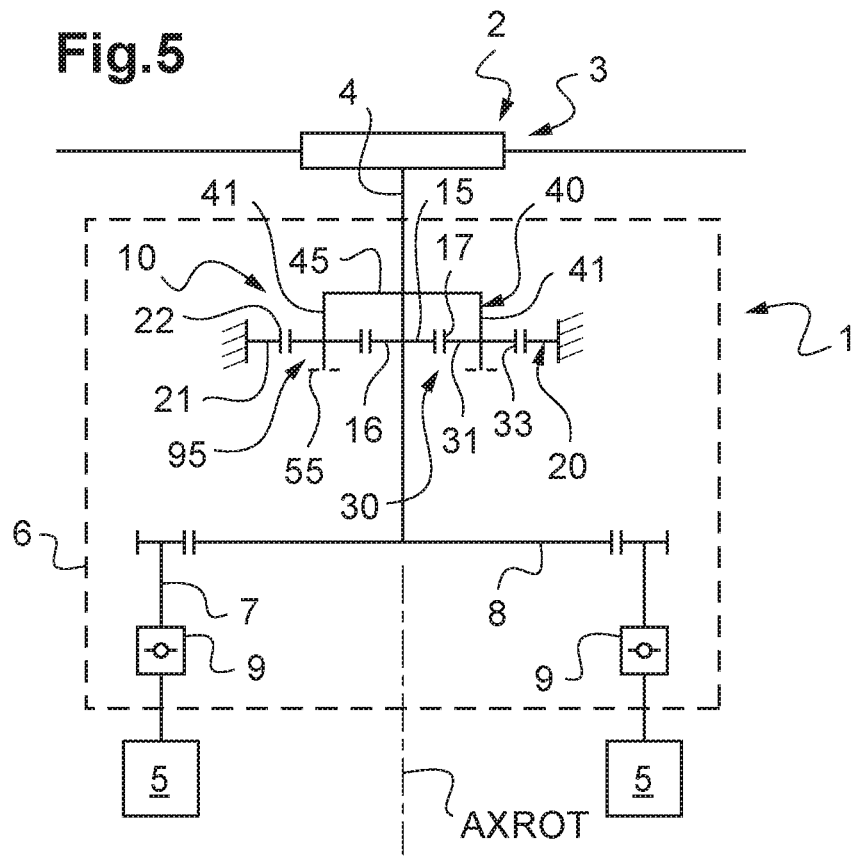
FIG. 5 is a diagram showing an aircraft and a gearbox provided with an epicyclic geartrain of the invention.

FIG. 5 shows an epicyclic geartrain 10 of the invention. This epicyclic geartrain 10 has a sun gear 15. The sun gear 15 thus has a rim 16 carrying teeth 17. For example, the teeth 17 are positioned on an edge face of the rim 16 of the sun gear 15.

Furthermore, the epicyclic geartrain 10 has an outer annulus gear 20. For example, the outer annulus gear 20 has a ring 21 carrying teeth 22. The teeth 22 of the outer annulus gear 20 face the teeth 17 of the sun gear 15.

The sun gear 15 and/or the outer annulus gear 20 possess a degree of freedom to rotate about an axis of rotation AXROT. The sun gear 15 and said outer annulus gear 20 are coaxial.

Also, the epicyclic geartrain 10 is provided with a planet carrier 40. The planet carrier 40 is provided with a support 45 carrying a plurality of pins 41. Each pin 41 carries at least one planet gear 30. For example, each pin 41 carries a single planet gear 30. Each planet gear 30 has teeth 33 co-operating with the teeth of the outer annulus gear 20 and with the teeth of the sun gear 15.

Furthermore, a retaining link 55 is carried jointly by each of the pins 41. Each planet gear 30 is arranged in a zone 95 lying in elevation between the support 45 of the planet carrier 40 and the retaining link 55. Each pin 41 presents a degree of freedom to move in restricted manner relative to the retaining link 55. By way of example, each pin presents a restricted degree of freedom to move relative to the retaining link along a direction that is tangential, i.e. substantially around the axis of rotation AXROT of the planet carrier, and thus tangentially to a circle centered on this axis of rotation AXROT.

With reference to FIG. 5, an epicyclic geartrain 10 may be arranged in a gearbox and/or on an aircraft, and in particular on an aircraft that is provided with a rotary wing 2. For example, the aircraft 1 has at least one engine 5 that drives rotation of the members of a main gearbox 6, the main gearbox 6 driving rotation of a main rotor 3 of the rotary wing 2. For example, the main gearbox 6 has a respective inlet shaft 7 for each engine 5, each inlet shaft 7 being connected to its engine 5 via a conventional overrunning clutch or "freewheel" 9. The inlet shaft 7 drives the rotary wing 2 via various gears of the main gearbox 6. For example, each inlet shaft 7 drives rotation of a pinion gear that meshes with a combining gear 8. In this example, the combining gear 8 then drives rotation of the sun gear 15 of an epicyclic geartrain 10 of the invention, with the planet carrier 40 of the epicyclic geartrain 10 being connected to the rotary wing 2 by a rotor mast 4.

Figure 6:
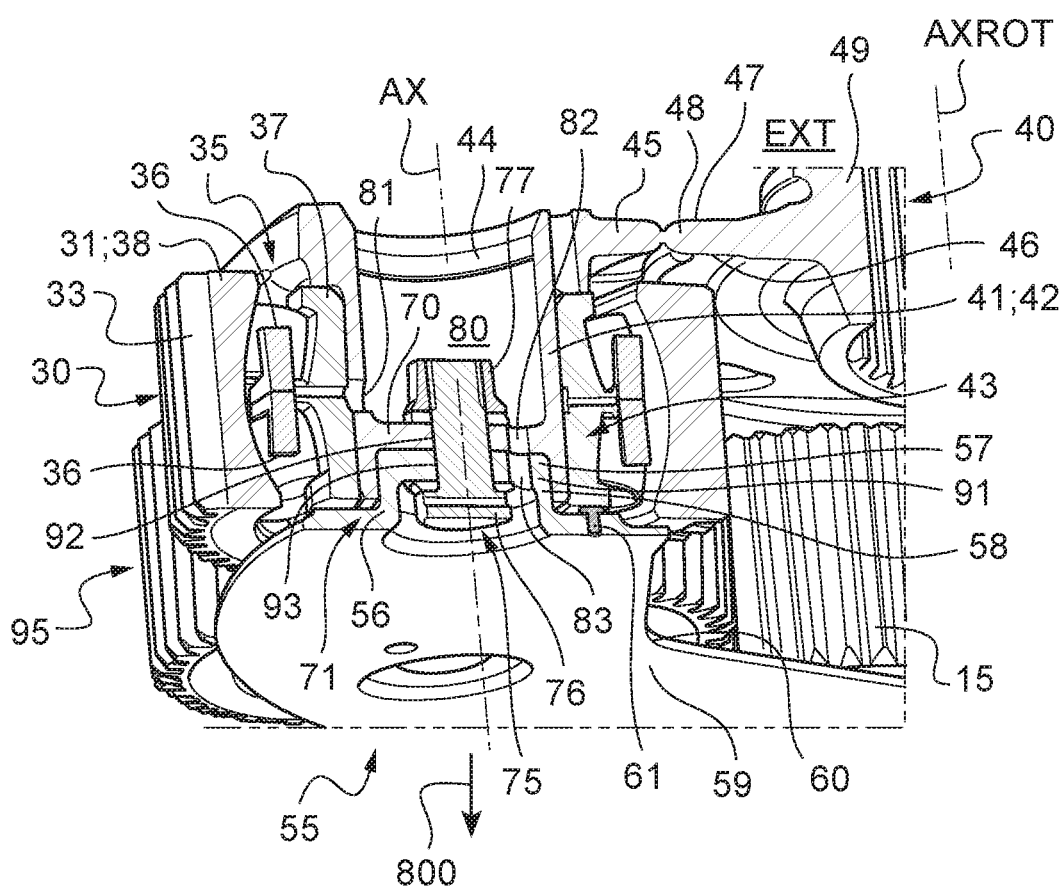
FIG. 6 is a diagram showing an epicyclic geartrain having centering studs penetrating into the pins.

FIG. 6 is a detail view of a planet carrier 40 and of a retaining link 55 in a first embodiment of the invention.

Whatever the embodiment, the epicyclic geartrain 10 possesses multiple planet gears 3, each arranged in the annular zone 95 that is present radially between the teeth of the outer annulus gear and the teeth 17 of the sun gear 15, and axially between the support 45 and the retaining link 55. The outer annulus gear is not shown in FIG. 5 in order to avoid overburdening this figure. All of the planet gears 30 are carried by a single planet carrier 40.

Such a planet carrier 40 presents a support 45. The support 45 extends in a direction 800 from a second face 47 towards a first face 46, the first face 46 facing the planet gears 30. For example, this direction 800 is parallel to the axis of rotation AXROT of the planet carrier 40. The support 45 may be secured to a connection tube 49.

In another aspect, the support 45 may present a main plate 48, e.g. of annular shape. The main plate 48 extends in its thickness direction from the first face 46 to the second face 47. In another example, the support 45 comprises arms carrying the pins 41.

Furthermore, the planet carrier 40 is provided with a plurality of pins 41 carried by the support 45. Each pin 41 possesses a fastening segment 42. The fastening segment 42 extends away from the support 45, where appropriate from said first face 46 of the main plate 48, by extending along the direction 800 from a proximal end 44 to a distal end 43.

The term "end" may be used to cover an end zone. The terms "distal end" and "proximal end" then designate respective segments of the pin along the extension axis AX of the pin. For example, a pin may be shared between a proximal segment 44 and a distal segment 43 one in line with the other along the extension axis.

The proximal end 44 may be substantially cylindrical in shape and may be hollow so as to define an inside space 80. Furthermore, the inside space 80 may be in fluid flow communication with an external medium EXT situated outside the epicyclic geartrain 10, communication possibly taking place via an opening in the support 45.

Likewise, the distal end 43 may be substantially cylindrical in shape and may be hollow.

Furthermore, each pin 41 may include a web 70. In FIG. 6, the web 70 may be interposed between the proximal end 44 and the distal end 43, the distal end 43 then radially defining a cavity 71 that opens to the outside. In section in a plane containing the extension axis AX of the pin 41, the pin 41 may then be H-shaped.

In another example, the web 70 may be situated at the tip of the distal end 43, for example. In section in a plane containing the extension axis AX of the pin, the pin 41 may then be U-shaped.

Independently of this aspect, each pin 41 may be an integral portion of the support 45, with the support 45 and the pins 41 then forming a single piece. In another example, a pin 41 may be fastened to the support 45 in conventional manner.

Whatever the way in which the pins 41 are embodied, each planet gear 30 is arranged around a fastening segment 42 of a pin 41 so as to present at least one degree of freedom to move in rotation about the extension axis AX of the pin and of the fastening segment 42. A single pin 41 may carry one or more planet gears 30. Furthermore, each planet gear 30 meshes with the sun gear 15 and with the outer annulus gear 20 (not shown in FIG. 6).

Under such circumstances, each planet gear 30 includes a rim 31 carrying teeth 33 on its outer periphery that mesh with the teeth 17 of the sun gear 15 and with the teeth 22 of the outer annulus gear 20. Furthermore, a bearing system 35 is interposed between an inner periphery of the rim 31 and a pin 41. Such a bearing system 35 may comprise rolling members 36, e.g. balls or rollers, and in particular rollers of barrel shape. Barrel-shaped rollers tend to keep the teeth of the planet gears substantially parallel to the teeth of the outer annulus gear 20 and of the sun gear 15. By way of example, a single planet gear may co-operate with two bearing members.

The rolling members 36 are arranged between an outer race 38 constrained to rotate with the teeth 32 of the planet gear 30, and an inner race 37 secured to a pin 41. The outer race 38 may be a portion of the rim 31, or it may be fastened to the rim 31. Likewise, the inner race 37 may be a portion of a pin 41, or it may be fastened to the pin 41.

Furthermore, the epicyclic geartrain 10 includes a holder system 50 for keeping two adjacent pins 41 spaced apart by a distance that lies substantially in a predefined non-zero range.

The holder system 50 includes a retaining link 55 connecting together the pins 41, while allowing each pin 41 a limited degree of freedom to move relative to the retaining link 55.

The retaining link 55 is thus carried by each of the pins 41. By way of example, the retaining link 55 may be substantially annular in shape.

The retaining link 55 includes a respective centering stud 56 for each pin 41. Thus, each pin 41 co-operates with a single centering stud 56. In the same manner, each centering stud 56 co-operates with a single pin 41. A pin 41 and the centering stud 56 co-operating with the pin 41 are said to be "associated".

Furthermore, the centering studs 56 are connected together by rigid link members, e.g. by an annular plate 59 in the variant shown, or by connecting rods, . . . . Thus, each centering stud 56 may extend from a rigid link member, i.e. the plate 59 in FIG. 6, to a pin 41. Between two adjacent centering studs 56, the retaining link 55, and where applicable the plate 59, present a thickness 60 that is appropriate for its function, i.e. a thickness that makes it possible to achieve stiffness that is low in bending and high in traction. By way of example, the thickness of the retaining link between pins is five times smaller than the thickness of the support of the planet carrier.

In another aspect, a pin 41 and the associated centering stud 56 are engaged at least in part axially one in the other along the extension axis AX of the pin 41. Optionally, a pin 41 and the associated centering stud 56 may be complementary in shape.

In the first embodiment of FIG. 6, a centering stud 56 penetrates into a cavity 71 in the associated pin 41.

Figure 7:
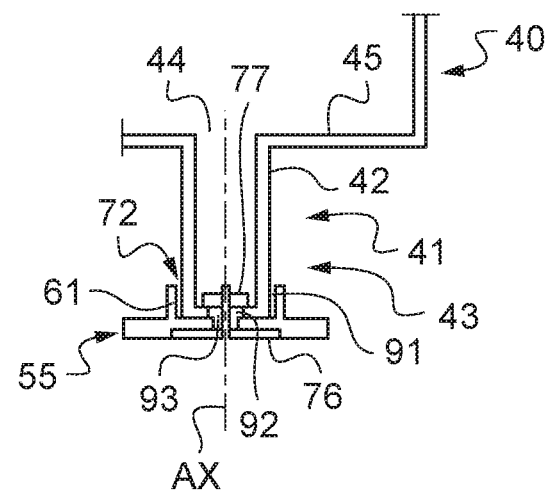
FIG. 7 is a diagram showing an epicyclic geartrain having centering means penetrating into the centering studs.

In the second embodiment of FIG. 7, the centering stud 41 penetrates into a cavity 72 in the associated pin 56.

Nevertheless, whatever the embodiment, and by way of example with reference to FIG. 6, at rest, radial clearance 91 lies between a pin 41 and the associated centering stud 56 in all directions orthogonal to the extension axis AX of the pin 41.

Furthermore, and whatever the embodiment, each centering stud 56 has a connection wall 57. At rest, the connection wall is substantially parallel to the web of the associated pin.

In the first embodiment of FIG. 6, a centering stud 56 includes a side wall 58 that extends from a bottom zone to a top, the top being closed in part by the connection wall 57. In section in a plane containing an extension axis AX of the pin 41, the centering stud 56 at rest may present substantially an upside down U-shape. Under such circumstances, the connection wall 57 is inserted in the cavity 71 of the associated pin 41.

In the second embodiment of FIG. 7, a centering peg 56 as a side wall 58 that extends from a bottom zone to an open top, the connection wall 57 being located axially between the bottom zone and the top. In section in a plane containing an extension axis AX of the pin 41, the centering stud 56 at rest may present substantially an H-shape. The centering stud 56 then includes a cavity 72, this cavity 72 being defined radially by the side wall and being located axially between the connection wall 57 and the top. The distal end 43 of the associated pin 41 is then inserted in this cavity 72.

Whatever the embodiment, and by example with reference to FIG. 6, each connection wall 57 may be connected to a web 70 by means of a screw-and-nut system 75 having a threaded member 76. For example, a screw 76 passes through the connection wall 57 and the web 70 in order to be screwed into a nut 77, with a washer being arranged between the head of the screw 76 and the connection wall 57, and with another washer being arranged between the nut 77 and the web 70.

Optionally, at rest, the connection wall 57 bears against the web 70.

Furthermore, at rest, first clearance 92 may lie radially between the threaded member 76 and the web 70, in all directions that are orthogonal to the extension axis AX of the pin 41. Likewise, second clearance 93 lies radially between the threaded member 76 and the connection well 57 in all directions orthogonal to the extension axis AX of the pin 41. Under such circumstances, the first clearance 92 and/or the second clearance 93 is greater than the radial clearance 91, or indeed is greater than or equal to twice the radial clearance 91.

Whatever the embodiment, and by way of example with reference to FIG. 6, each pin 41 may include a lubrication orifice 81 putting a planet gear 30 carried by the pin into fluid flow communication with the inside space 80 of the pin 41. Furthermore, the web 70 may present a first channel 82 facing a second channel 83 of the associated centering pin and opening out to the external medium EXT, the first channel 82 being in fluid flow communication with the second channel 83.

Whatever the embodiment, and by way of example with reference to FIG. 6, the retaining link 55 may also include a respective stop system for each pin 41. Such a stop system projects from the retaining link, and by way of example the stop system may include a stop stud 61 projecting from a plate carrying the centering studs, towards the zone 95. The stop stud 61 prevents an inner race 37 of a bearing member from moving in rotation relative to the pin 41 as a result of shapes interfering.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. An epicyclic geartrain comprising a sun gear and an outer annulus gear, the epicyclic geartrain being provided with a plurality of planet gears that are carried by a common planet carrier, the planet carrier comprising a support and a plurality of pins carried by the support, each pin having a fastening segment extending in a direction away from the support to a distal end, each planet gear being arranged around a respective one of the fastening segments and presenting a degree of freedom to move in rotation about an extension axis along which the fastening segment extends, wherein the epicyclic geartrain includes a retaining link that is carried by the pins and that connects the pins together, each planet gear being arranged in a zone lying between the support and the retaining link, each pin presenting a restricted degree of freedom to move relative to the retaining link, the retaining link including a respective centering stud for each pin, each pin and an associated centering stud being engaged at least in part axially one in the other along the extension axis of the pin, the centering stud penetrating into a cavity in the associated pin or the pin penetrating into a cavity in the associated centering stud, a pin and the associated centering stud being spaced apart at rest by radial clearance perpendicular to the extension axis of the pin.

2. The epicyclic geartrain according to claim 1, wherein the retaining link comprises a plate.

3. The epicyclic geartrain according to claim 1, wherein the retaining link is annular in shape.

4. The epicyclic gear rain according to claim 1, wherein each centering stud includes a connection wall, each pin including a web, and each connection wall is screwed to a web by a threaded member.

5. The epicyclic geartrain according to claim 4, wherein, at rest, the connection wall bears along the extension axis against the web.

6. The epicyclic geartrain according to claim 4, wherein the threaded member and the web are spaced apart radially by first clearance perpendicular to the extension axis of the pin, the threaded member and the connection wall being spaced apart radially by second clearance perpendicular to the extension axis of the pin, at least one of the first clearance and the second clearance being greater than the radial clearance.

7. The epicyclic geartrain according to claim 6, wherein at least one of the first clearance and the second clearance is greater than or equal to twice the radial clearance.

8. The epicyclic geartrain according to claim 4, wherein each pin presents an internal space in hydraulic communication with an outside medium, the pin presenting a lubrication orifice in fluid flow communication with a planet gear carried by the pin, the web presenting a first channel facing a second channel of the connection will, the second channel opening out to the outside medium.

9. The epicyclic geartrain according to claim 4, wherein the retaining link includes a stop system for stopping rotation of an inner race of a bearing member of each pin, the stop system projecting from the retaining link towards the zone in order to prevent the inner race of a bearing member from rotating relative to the pin, the bearing member being interposed between a pin and a planet gear.

10. The epicyclic geartrain according to claim 1, wherein between two centering studs, the retaining link presents thickness that is at least five times smaller than the thickness of the support.

11. A gearbox wherein the gearbox includes the epicyclic geartrain according to claim 1.

12. An aircraft wherein the gearbox includes the epicyclic geartrain according to claim 1.

13. A method of optimizing the epicyclic geartrain comprising a sun gear and an outer annulus gear, the epicyclic geartrain being provided with a plurality of planet gears that are carried by a common planet carrier, the planet carrier comprising a support and a plurality of pins carried by the support, each pin having a fastening segment extending in a direction away from the support to a distal end, each planet gear being arranged around a respective one of the fastening segments and presenting a degree of freedom to move in rotation about the fastening segment extends, wherein each distal end is spaced apart from another distal end adjacent thereto by a distance, and the method including a step of connecting the pins together with a retaining link, each pin having a restricted degree of freedom to move relative to the retaining link, the retaining link exerting no force on the pins under normal conditions, and keeping the distance within a predefined range in the presence of a crack in a planet gear, the retaining link including a respective centering stud for each pin, each pin and an associated centering stud being engaged at least in part axially one in the other along the extension axis of the pin, the centering stud penetrating into a cavity in the associated pin or the pin penetrating into a cavity in the associated centering stud, a pin and the associated centering stud being spaced apart at rest by radial clearance perpendicular to the extension axis of the pin.

* * * * *